(12) United States Patent
Jiang et al.

(10) Patent No.: US 10,528,781 B2
(45) Date of Patent: Jan. 7, 2020

(54) DETECTION METHOD AND SYSTEM FOR CHARACTERISTIC PATTERNS OF HAN XIN CODES

(71) Applicant: FUJIAN LANDI COMMERCIAL EQUIPMENT CO., LTD., Fuzhou, Fujian (CN)

(72) Inventors: Shengzhang Jiang, Fujian (CN); Weidong Wu, Fujian (CN)

(73) Assignee: FUJIAN LANDI COMMERCIAL EQUIPMENT CO., LTD., Fuzhou (CN)

( * ) Notice: Subject to any disclaimer, the term of this patent is extended or adjusted under 35 U.S.C. 154(b) by 88 days.

(21) Appl. No.: 15/895,986

(22) Filed: Feb. 13, 2018

(65) Prior Publication Data

US 2018/0181785 A1    Jun. 28, 2018

Related U.S. Application Data

(63) Continuation of application No. PCT/CN2016/092816, filed on Aug. 2, 2016.

(30) Foreign Application Priority Data

Sep. 7, 2015   (CN) .......................... 2015 1 0561307

(51) Int. Cl.
    *G06K 7/14*      (2006.01)
    *G06K 9/00*      (2006.01)
    *G06K 9/46*      (2006.01)
(52) U.S. Cl.
    CPC ......... *G06K 7/1447* (2013.01); *G06K 7/1417* (2013.01); *G06K 7/1452* (2013.01); *G06K 9/00* (2013.01); *G06K 9/468* (2013.01)

(58) Field of Classification Search
    CPC .. G06K 7/1447; G06K 7/1452; G06K 7/1417; G06K 9/00; G06K 9/468
    See application file for complete search history.

(56) References Cited

U.S. PATENT DOCUMENTS 9,177,188 B2 * 11/2015 Zhang .................. G06K 7/1456

FOREIGN PATENT DOCUMENTS

| CN | 102831428 A | 12/2012 |
|----|-------------|---------|
| CN | 103177235 A | 6/2013  |
| CN | 104298947 A | 1/2015  |
| CN | 104517090 A | 4/2015  |

* cited by examiner

*Primary Examiner* — Sonji N Johnson

(57) ABSTRACT

The invention provides a detection method and system for characteristic patterns of Han Xin codes. The detection method comprises the steps: binarizing a received two-dimensional code image, scanning the two-dimensional code image line-by-line and column-by-column so as to search out the four vertexes of a Han Xin code region, connecting every two vertexes of the four vertexes so as to form the four boundaries and two diagonal lines of the Han Xin code region, searching out four characteristic line segments starting from the vertexes and having the continuous binarization values 1, 0, 1, 0, 1 from the two diagonal lines and also searching out the end points of the characteristic line segments, and calculating the boundaries and the data bit width of position detection patterns of the Han Xin code according to the start points and the end points of the characteristic line segments.

10 Claims, 5 Drawing Sheets

DETECTION METHOD AND SYSTEM FOR CHARACTERISTIC PATTERNS OF HAN XIN CODES

CROSS REFERENCE TO RELATED APPLICATIONS

The present application is a Continuation Application of PCT Application No. PCT/CN2016/092816 filed on Aug. 2, 2016, which claims the benefit of Chinese Patent Application No. 201510561307.3 filed on Sep. 7, 2015. All the above are hereby incorporated by reference.

TECHNICAL FIELD

The invention relates to the field of recognition of two-dimensional codes, in particular to a detection method and system for the characteristic patterns of Han Xin codes.

DESCRIPTION OF RELATED ART

Han Xin Code is a major scientific and technological program of the tenth Chinese five-year plan and is a novel two-dimensional code symbology developed according to actual application requirements in China and based on deep study on information coding of two-dimensional codes, error-correcting encoding and decoding and the symbol structure and has independent intellectual property rights. Detection of position detection patterns of two-dimensional codes is one of the important steps for decoding the two-dimensional codes; however, in the decoding process of the two-dimensional codes, the position detection patterns need to be detected and localized firstly, and then the two-dimension codes can be decoded.

Due to the lack of the rotational symmetry characteristic, the position detection patterns of Han Xin codes are difficult to detect when Han Xin codes rotate or incline to a certain extent. As the inclination angles cannot be known in advance in the decoding process, the position detection patterns are detected generally through line-by-line scanning. However, if the inclination angles of two-dimensional codes are large, position detection pattern characteristics generally cannot be detected through the line-by-line scanning method. As it is difficult to find out proportion data extremely similar to the characteristic proportions (namely the width ratio of black pixel points, white pixel points, black pixel points, white pixel points and black pixel points is 3:1:1:1:1) of the position detection patterns of Han Xin codes in the line-by-line scanning process, after line-by-line or column-by-column scanning, only two position detection patterns can be found out, and sometimes even no position detection pattern is detected.

The Chinese invention patent with the application No. CN103177235A discloses a recognition device and method for Han Xin codes under complex backgrounds, through which an image is roughly localized firstly according to sub-region characteristics and then accurately localized according to image-finding pattern scanning characteristics. The recognition method specifically comprises the steps: (3a) dividing a Han Xin code gray image into m*n sub-regions; (3b) calculating the contrast ratio of each sub-region; (3c) calculating the linear scale characteristic of each sub-region; (3d) screening and combining the sub-regions; and (3e) carrying out accurate localization according to the image-finding pattern scanning characteristics after rough localization is completed. Although the recognition method and device have good anti-interference performance and robustness and can accurately recognize bar codes, the calculation data size is large, many algorithms are used, and therefore, the Han Xin code recognition efficiency still needs to be improved, and the complexity still needs to be reduced.

BRIEF SUMMARY OF THE INVENTION

To solve the above technical problems, the invention provides a detection method and system for the characteristic patterns of Han Xin codes, which are high in anti-interference capacity and high in detection speed.

The technical scheme adopted by the invention for solving the above technical problems:

A detection method for the characteristic patterns of Han Xin codes comprises the following steps:

binarizing a received two-dimensional code image;

scanning the two-dimensional code image line-by-line and column-by-column so as to search out the four vertexes of a Han Xin code region;

connecting every two vertexes of the four vertexes so as to form the four boundaries and two diagonal lines of the Han Xin code region;

searching out four characteristic line segments starting from the vertexes and having the continuous binarization values 1, 0, 1, 0, 1 from the two diagonal lines and also searching out the end points of the characteristic line segments;

calculating the boundaries and the data bit width of the position detection patterns of the Han Xin code according to the start points and the end points of the characteristic line segments.

Beneficial effects of the invention: the four vertexes of the Han Xin code region are searched out firstly through line-by-line and column-by-column scanning, the four boundaries of the Han Xin code region are searched out through the four vertexes of the Han Xin code, then the four boundaries and the two diagonal lines of the Han Xin code region are formed, the four characteristic line segments are searched out from the two diagonal lines and defined as the diagonal lines of the four position detection patterns of the Han Xin code, the boundaries and the data bit width of the position detection patterns of the Han Xin code are finally worked out, in this way, even if the Han Xin code region rotates, the position detection patterns of the Han Xin code can still be searched out rapidly, and the anti-interference capacity and defection efficiency are high.

A detection system for the characteristic patterns of Han Xin codes comprises a binarization module, a first searching module, a formation module, a second searching module and a calculation module, wherein, the binarization module is used for binarizing a received two-dimensional code image;

the first searching module is used for searching out the four vertexes of a Han Xin code region by scanning the two-dimensional code image line-by-line and column-by-column;

the formation module is used for forming the four boundaries and the two diagonal lines of the Han Xin code region by connecting every two vertexes of the four vertexes;

the second searching module is used for searching out four characteristic line segments starting from the vertexes and having the continuous binarization values 1, 0, 1, 0, 1 from the two diagonal lines and also searching out the end points of the characteristic line segments;

the calculation module is used for calculating the boundaries and the data bit width of the position detection patterns of Han Xin codes according to the start points and the end points of the characteristic line segments.

Beneficial effects of the invention: the two-dimensional code image is scanned line-by-line and column-by-column to search out the four vertexes of the Han Xin code region, then the four boundaries and the two diagonal lines of the Han Xin code region are formed through the four vertexes, the four characteristic line segments are searched out with the vertexes of the two diagonal lines as the start points, the diagonal lines of the position detection patterns of the Han Xin code right correspond to the four characteristic line segments, in this way, the position detection patterns of the Han Xin code can be detected no matter whether the Han Xin code region rotates or not, and the anti-interference capacity and detection efficiency are high.

DESCRIPTION OF THE REFERENCE SIGNS

1, binarization module; 2, first searching module; 3, formation module; 4, second searching module; 5, recording module; 6, analysis module; 7, calculation module.

DETAILED DESCRIPTION OF THE INVENTION

The key concept of the invention: the four vertexes of the Han Xin code region are searched out firstly, then line segments with the proportion of the continuous pixel points 1 and the continuous pixel points 0 according with the standard characteristic proportion 3:1:1:1:1 or 1:1:1:1:3 of the Han Xin code are searched out from the two diagonal lines of the Han Xin code region, the searched-out line segments are the diagonal lines of the position detection patterns of the Han Xin code, and therefore, the position detection patterns of the Han Xin code can be detected without being affected by the rotation angle of the Han Xin code, and the anti-interference capacity and detection efficiency are high.

Detailed Description of the Invention:

As is shown in FIGS. 1-5, a detection method for the characteristic patterns of Han Xin codes comprises the following steps:

binarizing a received two-dimensional code image;

scanning the two-dimensional code image line-by-line and column-by-column so as to search out the four vertexes of the Han Xin code region;

connecting every two vertexes of the four vertexes so as to form the four boundaries and the two diagonal lines of the Han Xin code region;

searching out four characteristic line segments starting from the vertexes and having the continuous binarization values 1, 0, 1, 0, 1 from the two diagonal lines and also searching out the end points of the characteristic line segments;

calculating the boundaries and the data bit width of the position detection patterns of the Han Xin code according to the start points and the end points of the characteristic line segments.

Furthermore, the received two-dimensional code image is binarized, specifically, the gray threshold of the received two-dimensional code image is calculated through the maximum between-class variance method or the mean value method; and the received two-dimensional code is binarized according to the gray threshold.

From the above description, the maximum between-class variance method is used for calculating the gray threshold so that the influence of the background color on the foreground color can be reduced, and the error proofing capacity is high; and the mean value method is used for calculating the gray threshold, so that calculation is simple and rapid. Therefore, the method is rapid and direct and has small errors.

Figure 1:
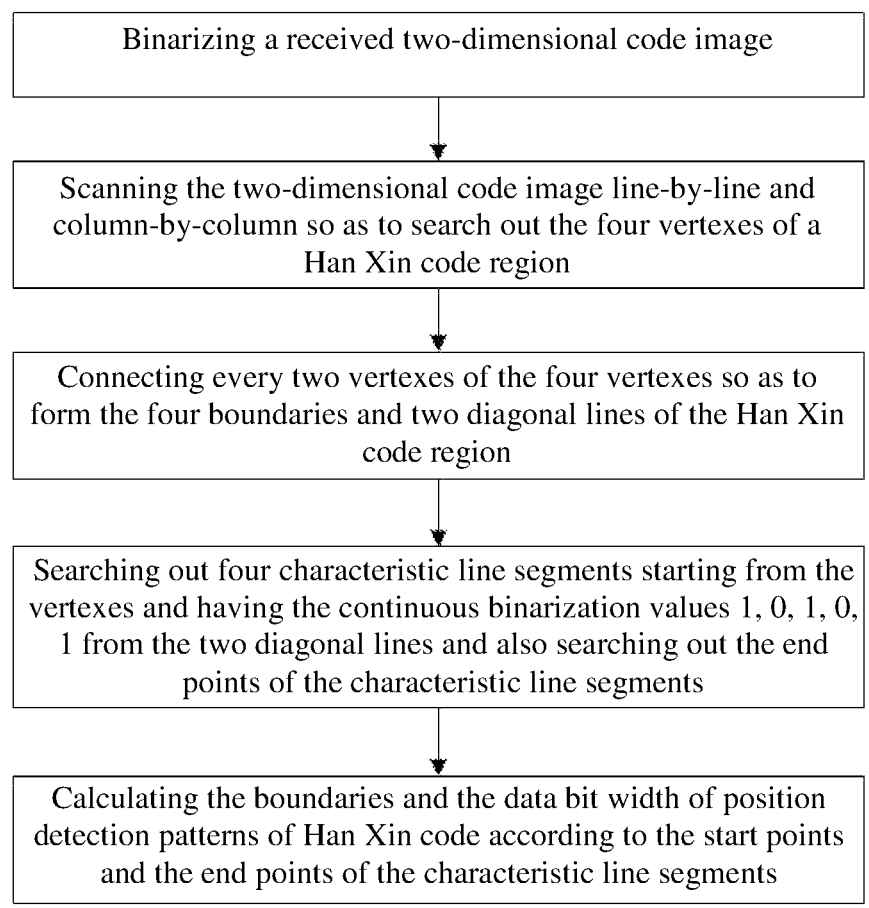
FIG. 1 is a flow diagram of a detection method for the characteristic patterns of Han Xin codes in the first embodiment of the invention.
Figure 2:
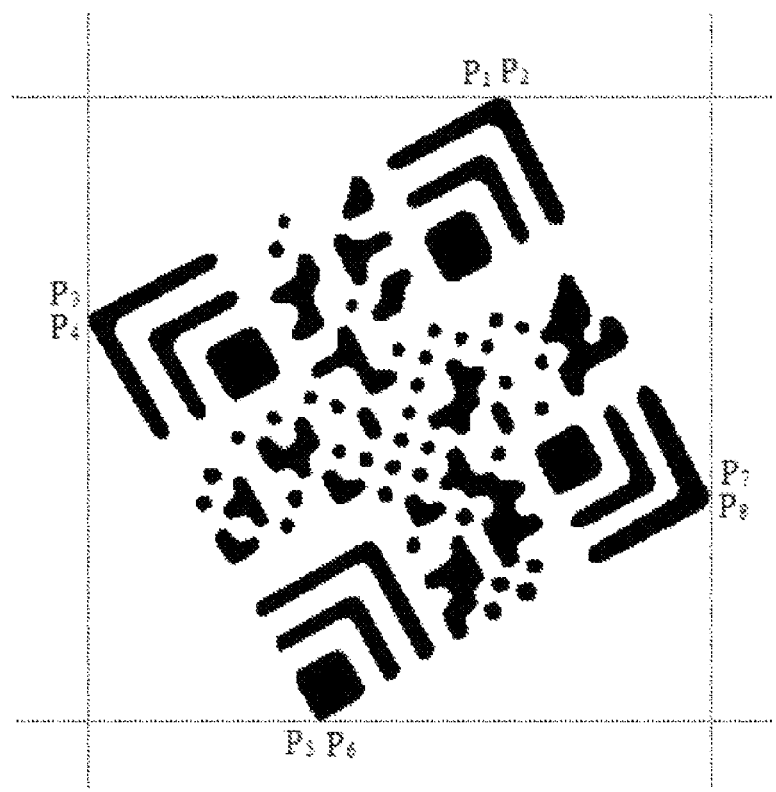
FIG. 2 is a diagram of the four vertexes, searched out through line-by-line and column-by-column scanning, of a Han Xin code region in the first embodiment of the invention.

Furthermore, as is shown in FIG. 2, the two-dimensional code image is scanned line-by-line and column-by-column so as to search out the four vertexes of the Han Xin code region, specifically, the two-dimensional code image is scanned line-by-line from top to bottom, data in the initial line are all white point, and when a line including data of black points is scanned, the leftmost black point is recorded as P1, and the rightmost black point is recorded as P2;

the two-dimensional code image is scanned column-by-column from left to right, data in the initial column are all white points, and when a column including data of black points is scanned, the uppermost black point is recorded as P3, and the lowermost black point is recorded as P4;

the two-dimensional code image is scanned line-by-line from bottom to top, data in the initial line are all white points, and when a line including data of black points is scanned, the leftmost black point is recorded as P5, and the rightmost black point is recorded as P6;

the two-dimensional code image is scanned column-by-column from right to left, data in the initial column are all white points, and when a column including data of black points is scanned, the uppermost black point is recorded as P7, and the lowermost black point is recorded as P8;

a distance threshold is preset, the distance between the two black points in any of the four sets of black points P1 and P2, P3 and P4, P5 and P6, and P7 and P8 is calculated, and whether the distance is smaller than the distance threshold or not is judged;

if the distance is smaller than the distance threshold, the midpoint between P1 and P2, the midpoint between P3 and P4, the midpoint between P5 and P6, and the midpoint between P7 and P8 are defined as the four vertexes of the Han Xin code region;

if the distance is greater than or equal to the distance threshold, the midpoint between P1 and P3, the midpoint between P4 and P5, the midpoint between P6 and P8, and the midpoint between P7 and P2 are defined as the four vertexes of the Han Xin code region.

From the above description, the four vertexes of the Han Xin code are all black points. If the Han Xin code region rotates, the two-dimensional code image is scanned line-by-line and column-by-column from the line or column including white points only till the line or column including black points is searched out, searched-out the line or column includes only one black point under the ideal condition. Actually, if the vertexes of the Han Xin code are damaged, the searched-out the line or column includes more than one continuous black points, and the midpoints between the continuous black points are adopted to eliminate the influence of damage to the vertexes of the Han Xin code on searching for the vertexes of the Han Xin code through the distance threshold. If the Han Xin code region does not rotate, the black points in the searched-out line or column are discontinuous within the width range of the Han Xin code, the maximum distance between two black points in the line or the column is greater than the preset distance threshold, and in this case, the vertexes of the Han Xin code region depend on the black points at the junctions of two lines and two columns intersecting with the two lines. Therefore, the method is high in decoding efficiency and anti-interference capacity and has small errors.

Furthermore, the detection method comprises the following steps:

presetting a proportion threshold and recording the number of data sets, each continuously including 1, 0, 1, 0, 1, in each characteristic line segment from the start point of the characteristic line segment so as to obtain a characteristic proportion;

analyzing whether the similarities between the characteristic proportions and the standard characteristic proportion 3:1:1:1:1 or 1:1:1:1:3 of the Han Xin code are within the range of the proportional threshold or not through analysis;

not decoding the two-dimensional code image if the similarities between the characteristic proportions and the standard characteristic proportion of the Han Xin code are not within the range of the proportion threshold.

From the above description, after the four characteristic line segments are searched out from the two diagonal lines, whether the similarities between the four characteristic proportions and the standard characteristic proportion 3:1:1:1:1 or 1:1:1:1:3 of the Han Xin code are within the range of the proportional threshold or not is judged. If the two-dimensional code image contains a Han Xin code, three of the four characteristic proportions are similar to the standard characteristic proportion 1:1:1:1:3 of the Han Xin code, and one of the four characteristic proportions is similar to the standard characteristic proportion 3:1:1:1:1 of the Han Xin code. If the four characteristic proportions meet the condition, the received two-dimensional code image contains a Han Xin code and can be decoded subsequently, otherwise, the two-dimensional code image is not decoded. Therefore, the method is reasonable, and whether the received two-dimensional code image contains a Han Xin code or not can be further determined, and the decoding success rate is high.

Furthermore, whether the similarities between the characteristic proportions and the standard characteristic proportion of the Han Xin code are within the range of the proportion threshold is not is judged, specifically, initial data of the characteristic proportions are converted into data identical with the initial data of the standard characteristic proportion of the Han Xin code, and all other data of the characteristic proportions are equivalently converted, so that converted characteristic proportions are obtained;

the differences between the data, except the initial data, of the converted characteristic proportions and the data on the corresponding bits of the standard characteristic proportion of the Han Xin code are calculated, and the absolute values of the differences are worked out;

if the absolute value corresponding to each bit is smaller than the proportion threshold, the similarities between the characteristic proportions and the standard characteristic proportion of the Han Xin code are smaller than the proportion threshold.

From the above description, the initial data of the characteristic proportions are converted into data identical with the initial data of the standard characteristic proportion of the Han Xin code, all other data of the characteristic proportions are equivalently converted, finally, the absolute values of the differences between the data of the converted characteristic proportions and the data at the corresponding bits of the standard characteristic proportion of the Han Xin code are compared with the preset proportion threshold, and thus the similarity analysis process is simple, direct and rapid.

Furthermore, the detection method comprises the following step:

not decoding the two-dimensional code image if the similarity between one of the four characteristic proportions and the standard characteristic proportion 3:1:1:1:1 of the Han Xin code and the similarities between the other three characteristic proportions and the standard characteristic proportion 1:1:1:1:3 of the Han Xin code are not within the range of the proportion threshold.

From the above description, if the condition mentioned above is met, it indicates that the received two-dimensional code image contains a Han Xin code, and the method is accurate.

Figure 4:
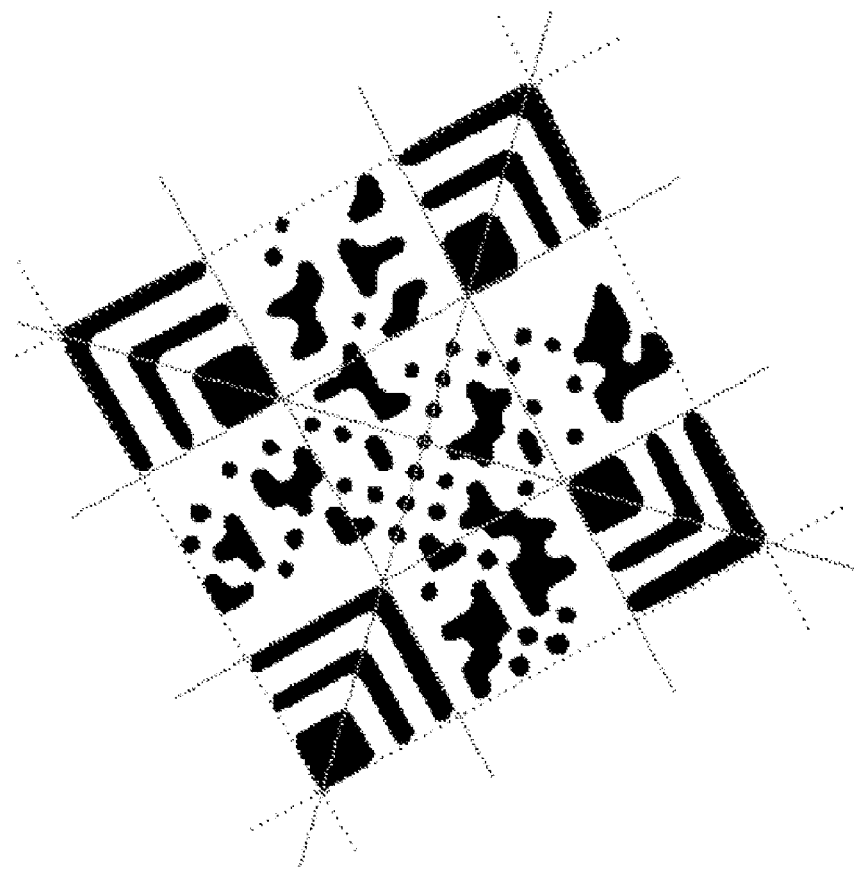
FIG. 4 is a diagram of the four position detection patterns obtained according to four characteristic line segments searched out from the two diagonal lines in the first embodiment of the invention.

As is shown in FIG. 4, furthermore, the boundaries of the position detection patterns of the Han Xin code are calculated according to the start points and the end points of the characteristic line segments, specifically, two straight lines which are parallel to the two boundaries, passing through the start point of each characteristic line segment, of the Han Xin code region and pass through the end point of the characteristic line segment are calculated;

the edges of the square defined by the two boundaries, passing through the start point of each characteristic line segment, of the Han Xin code region and the two straight lines obtained through calculation are the boundaries of one position detection pattern of the Han Xin code.

From the above description, the boundaries of the position detection patterns of the Han Xin code are obtained through translation of the boundaries of the Han Xin code region according to the start points and the end points of the characteristic line segments, and thus the accuracy of the boundaries of the position detection patterns of the Han Xin code is improved.

Furthermore, the data bit width of the position detection patterns of the Han Xin code is calculated according to the start points and the end points of the characteristic line segments, specifically, the length d of each characteristic line segment is worked out according to the start point and the end point of the characteristic line segment;

as it is known that the each boundary of each position detection pattern of the Han Xin code includes seven data bits, the data bit width 1 of each position detection pattern of the Han Xin code is calculated according to the length d of the characteristic line segments specifically through the following equation:

$$l = \frac{\sqrt{2}}{2} \cdot d/7.$$

From the above description, the length of the boundaries of the position detection patterns is obtained according to the length of the characteristic line segments, each boundary of each position detection pattern includes seven data bits, and thus the data bit width is the result obtained by dividing the length of the boundaries of the position detection patterns by seven. Therefore, the method is reasonable, and calculation is simple and rapid.

As is shown in FIGS. 1-4, as for the first embodiment of the invention:

A received two-dimensional code image is binarized, specifically, the gray threshold of the received two-dimensional code image is calculated through the maximum between-class variance method;

the received two-dimensional code is binarized according to the gray threshold.

As is shown in FIG. 2, the two-dimensional code image is scanned line-by-line and column-by-column so as to search out the four vertexes of the Han Xin code region, specifically, the two-dimensional code image is scanned line-by-line from top to bottom, data in the initial line are all white point, and when a line including data of black points is scanned, the leftmost black point is recorded as P1, and the rightmost black point is recorded as P2;

the two-dimensional code image is scanned column-by-column from left to right, data in the initial column are all white points, and when a column including data of black points is scanned, the uppermost black point is recorded as P3, and the lowermost black point is recorded as P4;

the two-dimensional code image is scanned line-by-line from bottom to top, data in the initial line are all white points, and when a line including data of black points is scanned, the leftmost black point is recorded as P5, and the rightmost black point is recorded as P6;

the two-dimensional code image is scanned column-by-column from right to left, data in the initial column are all white points, and when a column including data of black points is scanned, the uppermost black point is recorded as P7, and the lowermost black point is recorded as P8;

the distance threshold is preset as 4, the distance between the two black points in any of the four sets of black points P1 and P2, P3 and P4, P5 and P6, and P7 and P8 is calculated, and whether the distance is smaller than the distance threshold or not is judged;

as can be seen from FIG. 2, if the distance is smaller than the distance threshold, the midpoint between P1 and P2, the midpoint between P3 and P4, the midpoint between P5 and P6, and the midpoint between P7 and P8 are defined as the four vertexes of the Han Xin code region;

only under the condition that the Han Xin code region does not rotate, the distance is greater than or equal to the distance threshold, and in this case, the midpoint between P1 and P3, the midpoint between P4 and P5, the midpoint between P6 and P8, and the midpoint between P7 and P2 are defined as the four vertexes of the Han Xin code region.

Figure 3:
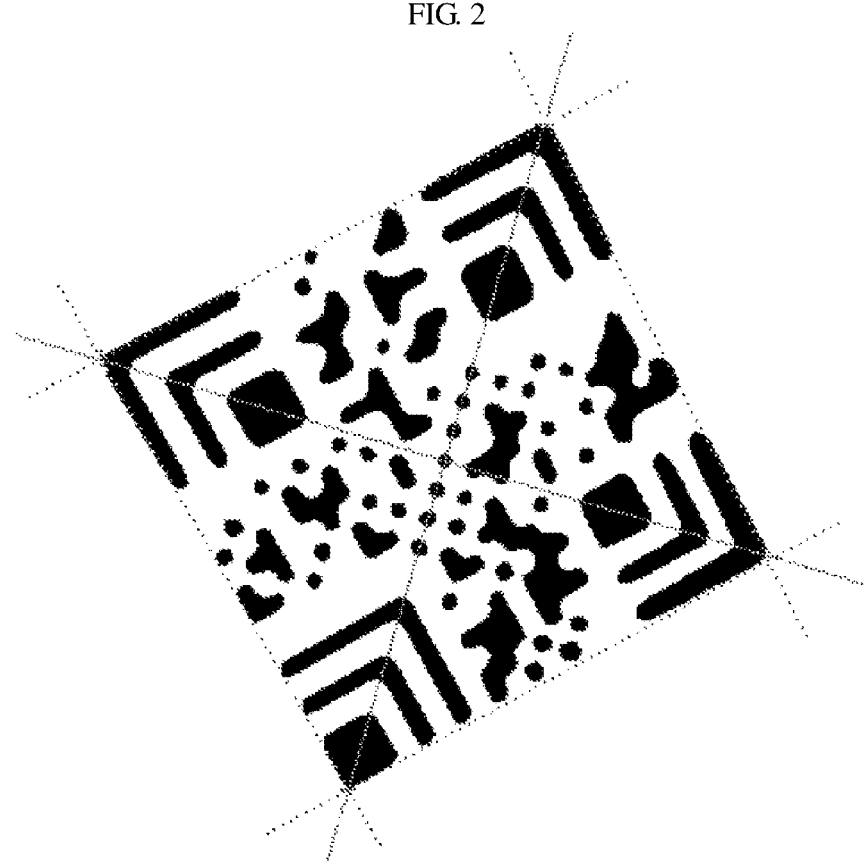
FIG. 3 is a diagram of the four boundaries and the two diagonal lines, formed according to the four vertexes, of the Han Xin code region in the first embodiment of the invention.

As is shown in FIG. 3, every two vertexes of the four vertexes are connected so as to form the four boundaries and the two diagonal lines of the Han Xin code region.

Four characteristic line segments starting from the vertexes and having the continuous binarization values 1, 0, 1, 0, 1 are searched out from the two diagonal lines, and the end points of the characteristic line segments are also searched out.

As is shown in FIG. 4, the boundaries of the position detection patterns of the Han Xin code are calculated according to the start points and the end points of the characteristic line segments, specifically, two straight lines which are parallel to the two boundaries, passing through the start point of each characteristic line segment, of the Han Xin code region and pass through the end point of the characteristic line segment are calculated;

the edges of the square defined by the two boundaries, passing through the start point of each characteristic line segment, of the Han Xin code region and the two straight lines obtained through calculation are the boundaries of one position detection pattern of the Han Xin code.

The data bit width of the position detection patterns of the Han Xin code is calculated according to the start points and the end points of the characteristic line segments, specifically, the length d of each characteristic line segment is worked out according to the start point and the end point of the characteristic line segment;

as it is known that the each boundary of each position detection pattern of the Han Xin code includes seven data bits, the data bit width 1 of each position detection pattern of the Han Xin code is calculated according to the length d of the characteristic line segments specifically through the following equation:

$$l = \frac{\sqrt{2}}{2} \cdot d/7.$$

Figure 5:
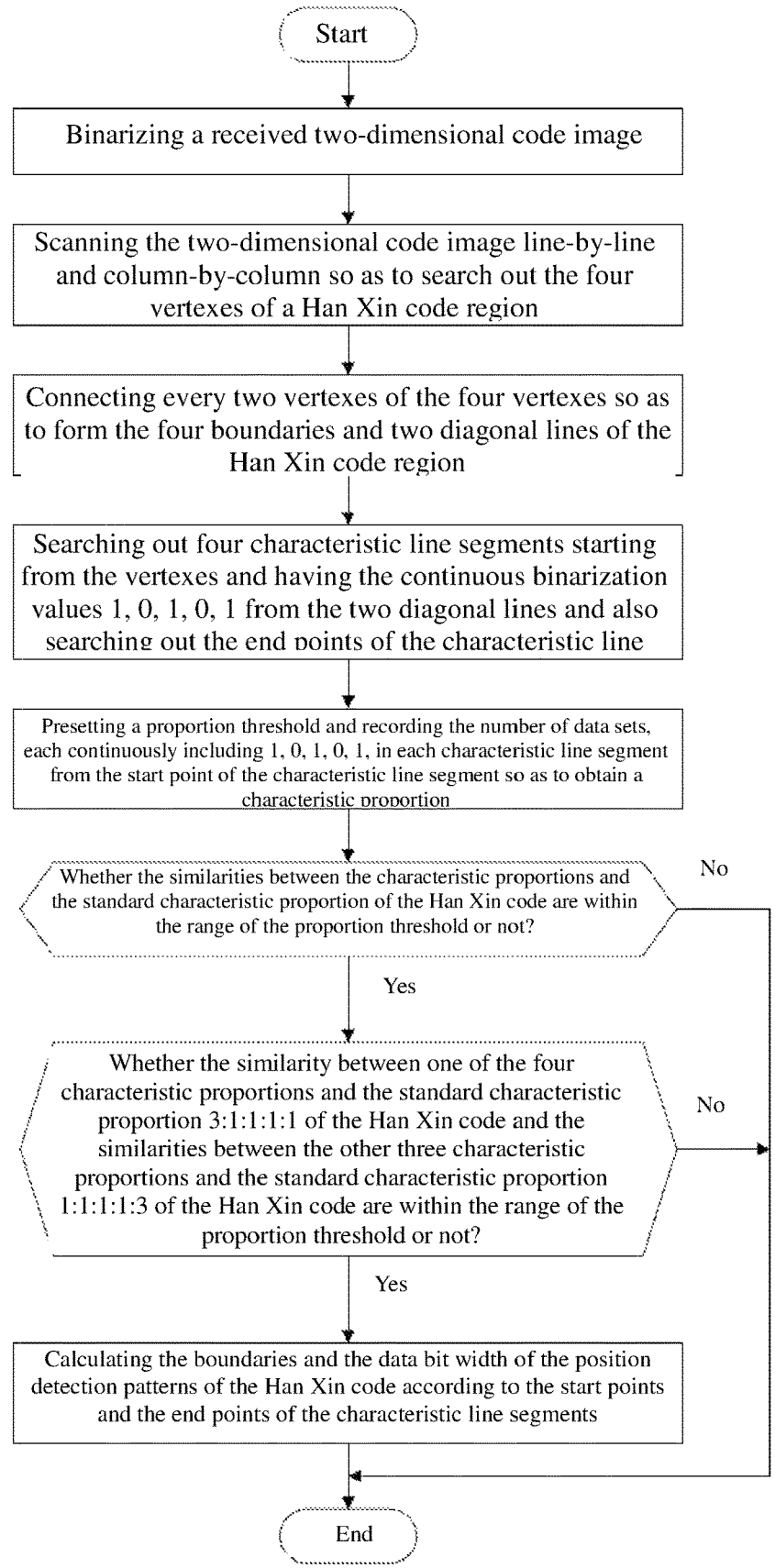
FIG. 5 is a flow diagram of a detection method for the characteristic patterns of Han Xin codes in the second embodiment of the invention.

As is shown in FIG. 5, as for the second embodiment of the invention:

A received two-dimensional code image is binarized.

The two-dimensional code image is scanned line-by-line and column-by-column so as to search out the four vertexes of the Han Xin code region.

Every two of the four vertexes are connected so as to form the four boundaries and two diagonal lines of the Han Xin code region.

Four characteristic line segments starting from the vertexes and having the continuous binarization values 1, 0, 1, 0, 1 are searched out from the two diagonal lines, and the end points of the characteristic line segments are also searched out.

A proportion threshold is preset, and the number of data sets, each continuously including 1, 0, 1, 0, 1, in each characteristic line segment is recoded from the start point of the characteristic line segment so as to obtain a characteristic proportion.

Whether the similarities between the characteristic proportions and the standard characteristic proportion 3:1:1:1:1 or 1:1:1:1:3 of the Han Xin code are within the range of the proportional threshold or not is judged through analysis, specifically, initial data of the characteristic proportions are converted into data identical with the initial data of the standard characteristic proportion of the Han Xin code, and all other data of the characteristic proportions are equivalently converted, so that converted characteristic proportions are obtained;

the differences between the data, except the initial data, of the converted characteristic proportions and the data on the corresponding bits of the standard characteristic proportion of the Han Xin code are calculated, and the absolute values of the differences are worked out;

if the absolute value corresponding to each bit is smaller than the proportion threshold, the similarities between the characteristic proportions and the standard characteristic proportion of the Han Xin code are smaller than the proportion threshold;

if the similarities between the characteristic proportions and the standard characteristic proportion of the Han Xin code are not within the range of the proportion threshold, the two-dimensional code is not decoded;

if the similarity between one of the four characteristic proportions and the standard characteristic proportion 3:1:1:1:1 of the Han Xin code and the similarities between the other three characteristic proportions and the standard characteristic proportion 1:1:1:1:3 of the Han Xin code are not within the range of the proportion threshold, the two-dimensional code image is not decoded.

The boundaries and the data bit width of the position detection patterns of the Han Xin code are calculated according to the start points and the end points of the characteristic line segments.

Figure 6:
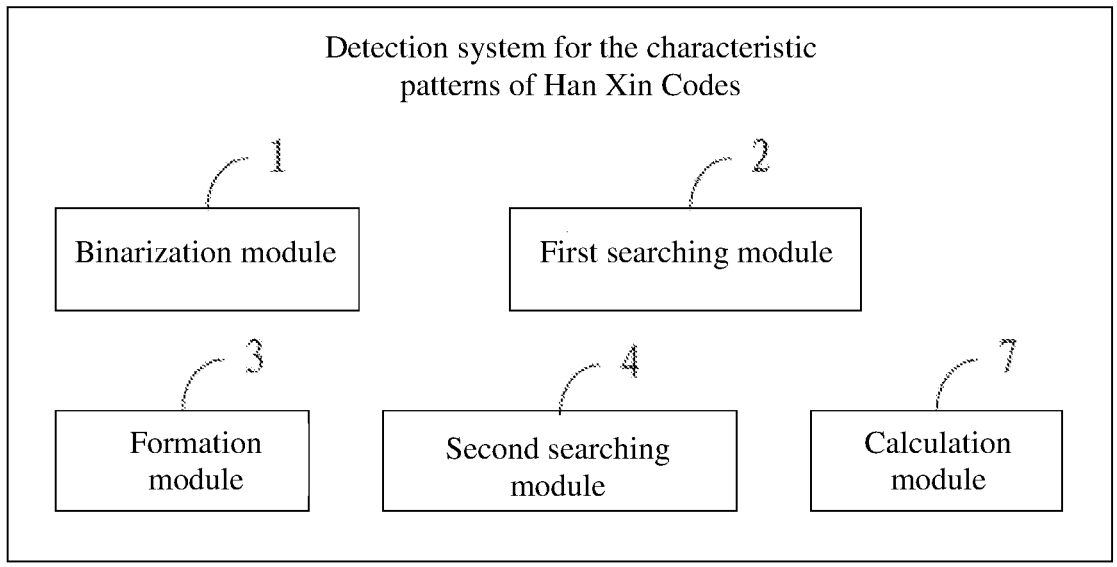
FIG. 6 is a system block diagram of a detection system for the characteristic patterns of Han Xin codes in the third embodiment of the invention.
Figure 7:
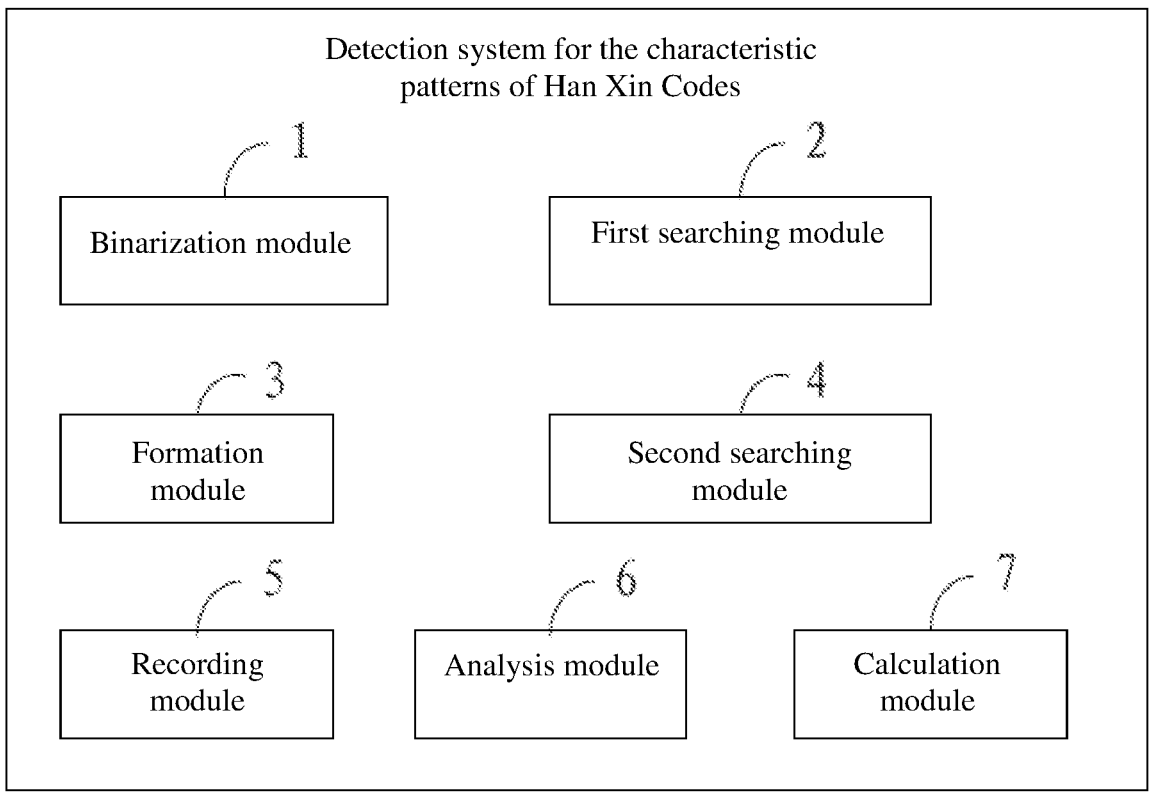
FIG. 7 is a system block diagram of a detection system for the characteristic patterns of Han Xin codes in the fourth embodiment of the invention.

As is shown in FIGS. 6-7, a detection system for the characteristic patterns of Han Xin codes comprises a binarization module 1, a first searching module 2, a formation module 3, a second searching module 4 and a calculation module 7, wherein, the binarization module 1 is used for binarizing a received two-dimensional code image;

the first searching module 2 is used for searching out the four vertexes of a Han Xin code region by scanning the two-dimensional code image line-by-line and column-by-column;

the formation module 3 is used for forming the four boundaries and the two diagonal lines of the Han Xin code region by connecting every two vertexes of the four vertexes;

the second searching module 4 is used for searching out four characteristic line segments starting from the vertexes and having the continuous binarization values 1, 0, 1, 0, 1 from the two diagonal lines and also searching out the end points of the characteristic line segments;

the calculation module 7 is used for calculating the boundaries and the data bit width of the position detection patterns of the Han Xin code according to the start points and the end points of the characteristic line segments.

Furthermore, the detection system comprises a recoding module 5 and an analysis module 6, wherein, the recoding module 5 is used for recording the number of data sets, each continuously including 1, 0, 1, 0, 1, in each characteristic line segment from the start point of the characteristic line segment;

the analysis module 6 is used for analyzing whether the similarities between the characteristic proportions and the standard characteristic proportion of the Han Xin code are within the range of the proportion threshold or not.

From the above description, whether the characteristic proportions of the characteristic line segments are similar to the standard characteristic proportion of the Han Xin code or not is judged through the recording module 5 and the analysis module 6, afterwards, whether the received two-dimensional code image contains a Han Xin code or not is determined finally, and thus the decoding accuracy of the system is ensured.

As is shown in FIG. 6, as for the third embodiment of the invention:

A detection system for the characteristic patterns of Han Xin codes comprises a binarization module 1, a first searching module 2, a formation module 3, a second searching module 4 and a calculation module 7, wherein, the binarization module 1 is used for binarizing a received two-dimensional code image;

the first searching module 2 is used for searching out the four vertexes of a Han Xin code region by scanning the two-dimensional code image line-by-line and column-by-column;

the formation module 3 is used for forming the four boundaries and the two diagonal lines of the Han Xin code region by connecting every two vertexes of the four vertexes;

the second searching module 4 is used for searching out four characteristic line segments starting from the vertexes and having the continuous binarization values 1, 0, 1, 0, 1 from the two diagonal lines and also searching out the end points of the characteristic line segments;

the calculation module 7 is used for calculating the boundaries and the data bit width of the position detection patterns of the Han Xin code according to the start points and the end points of the characteristic line segments.

As is shown in FIG. 7, as for the fourth embodiment of the invention:

A detection system for the characteristic patterns of Han Xin codes comprises a binarization module 1, a first searching module 2, a formation module 3, a second searching module 4, a recording module 5, an analysis module 6 and a calculation module 7, wherein, the binarization module 1 is used for binarizing a received two-dimensional code image;

the first searching module 2 is used for searching out the four vertexes of a Han Xin code region by scanning the two-dimensional code image line-by-line and column-by-column;

the formation module 3 is used for forming the four boundaries and the two diagonal lines of the Han Xin code region by connecting every two vertexes of the four vertexes;

the second searching module 4 is used for searching out four characteristic line segments starting from the vertexes and having the continuous binarization values 1, 0, 1, 0, 1 from the two diagonal lines and also searching out the end points of the characteristic line segments;

the recoding module 5 is used for recording the number of data sets, each continuously including 1, 0, 1, 0, 1, in each characteristic line segment from the start point of the characteristic line segment;

the analysis module 6 is used for analyzing whether the similarities between the characteristic proportions and the standard characteristic proportion of the Han Xin code are within the range of the proportion threshold or not.

the calculation module 7 is used for calculating the boundaries and the data bit width of the position detection patterns of the Han Xin code according to the start points and the end points of the characteristic line segments.

In conclusion, according to the detection method and system for the characteristic patterns of Han Xin codes, the four vertexes of the Han Xin code region are searched out through line-by-line and column-by-column scanning of the received two-dimensional code image without being affected by the rotation condition of the Han Xin code region, the four boundaries and the two diagonal lines of the Han Xin code region are determined through the four vertexes, the diagonal lines of the position detection patterns of the Han Xin code are searched out from the diagonal lines of the Han Xin code region, and therefore, the characteristics of the position detection patterns of the Han Xin code are fully utilized; and the method is high in anti-interference capacity and high in detection efficiency and speed.

What is claimed is:

1. A detection method for the characteristic patterns of Han Xin codes, characterized by comprising the following steps:
    binarizing a received two-dimensional code image;
    scanning the two-dimensional code image line-by-line and column-by-column so as to search out the four vertexes of a Han Xin code region;
    connecting every two vertexes of the four vertexes so as to form the four boundaries and two diagonal lines of the Han Xin code region;
    searching out four characteristic line segments starting from the vertexes and having the continuous binarization values 1, 0, 1, 0, 1 from the two diagonal lines and also searching out the end points of the characteristic line segments;
    calculating the boundaries and the data bit width of position detection patterns of the Han Xin code according to the start points and the end points of the characteristic line segments.

2. The detection method for the characteristic patterns of Han Xin codes according to claim 1, characterized in that the received two-dimensional code image is binarized, specifically,
    the gray threshold of the received two-dimensional code image is calculated through the maximum between-class variance method or the mean value method, and the received two-dimensional code is binarized according to the gray threshold.

3. The detection method for the characteristic patterns of Han Xin codes according to claim 1, characterized in that the two-dimensional code image is scanned line-by-line and column-by-column so as to search out the four vertexes of the Han Xin code region, specifically,
    the two-dimensional code image is scanned line-by-line from top to bottom, data in the initial line are all white point, and when a line including data of black points is scanned, the leftmost black point is recorded as P1, and the rightmost black point is recorded as P2;
    the two-dimensional code image is scanned column-by-column from left to right, data in the initial column are all white points, and when a column including data of black points is scanned, the uppermost black point is recorded as P3, and the lowermost black point is recorded as P4;
    the two-dimensional code image is scanned line-by-line from bottom to top, data in the initial line are all white points, and when a line including data of black points is scanned, the leftmost black point is recorded as P5, and the rightmost black point is recorded as P6;
    the two-dimensional code image is scanned column-by-column from right to left, data in the initial column are all white points, and when a column including data of black points is scanned, the uppermost black point is recorded as P7, and the lowermost black point is recorded as P8;
    a distance threshold is preset, the distance between the two black points in any of the four sets of black points P1 and P2, P3 and P4, P5 and P6, and P7 and P8 is calculated, and whether the distance is smaller than the distance threshold or not is judged;
    if the distance is smaller than the distance threshold, the midpoint between P1 and P2, the midpoint between P3 and P4, the midpoint between P5 and P6, and the midpoint between P7 and P8 are defined as the four vertexes of the Han Xin code region; if the distance is greater than or equal to the distance threshold, the midpoint between P1 and P3, the midpoint between P4 and P5, the midpoint between P6 and P8, and the midpoint between P7 and P2 are defined as the four vertexes of the Han Xin code region.

4. The detection method for the characteristic patterns of Han Xin codes according to claim 1, characterized by further comprising the steps: presetting a proportion threshold and recording the number of data sets, each continuously including 1, 0, 1, 0, 1, in each characteristic line segment from the start point of the characteristic line segment so as to obtain a characteristic proportion;
    analyzing whether the similarities between the characteristic proportions and the standard characteristic proportion 3:1:1:1:1 or 1:1:1:1:3 of the Han Xin code are within the range of the proportional threshold or not;
    not decoding the two-dimensional code image if the similarities between the characteristic proportions and the standard characteristic proportion of the Han Xin code are not within the range of the proportion threshold.

5. The detection method for the characteristic patterns of Han Xin codes according to claim 4, characterized in that whether the similarities between the characteristic proportions and the standard characteristic proportion of the Han Xin code are within the range of the proportion threshold is not is judged, specifically,
    initial data of the characteristic proportions are converted into data identical with the initial data of the standard characteristic proportion of the Han Xin code, and all other data of the characteristic proportions are equivalently converted, so that converted characteristic proportions are obtained;
    the differences between the data, except the initial data, of the converted characteristic proportions and the data on the corresponding bits of the standard characteristic proportion of the Han Xin code are calculated, and the absolute values of the differences are worked out;
    if the absolute value corresponding to each bit is smaller than the proportion threshold, the similarities between the characteristic proportions and the standard characteristic proportion of the Han Xin code are smaller than the proportion threshold.

6. The detection method for the characteristic patterns of Han Xin codes according to claim 5, characterized in that if the similarity between one of the four characteristic proportions and the standard characteristic proportion 3:1:1:1:1 of the Han Xin code and the similarities between the other three characteristic proportions and the standard characteristic proportion 1:1:1:1:3 of the Han Xin code are not within the range of the proportion threshold, the two-dimensional code image is not decoded.

7. The detection method for the characteristic patterns of Han Xin codes according to claim 1, characterized in that the boundaries of the position detection patterns of the Han Xin code are calculated according to the start points and the end points of the characteristic line segments, specifically, two straight lines which are parallel to the two boundaries, passing through the start point of each characteristic line segment, of the Han Xin code region and pass through the end point of the characteristic line segment are calculated;

the edges of the square defined by the two boundaries, passing through the start point of each characteristic line segment, of the Han Xin code region and the two straight lines obtained through calculation are the boundaries of one position detection pattern of the Han Xin code.

8. The detection method for the characteristic patterns of Han Xin codes according to claim 1, characterized in that the data bit width of the position detection patterns of the Han Xin code is calculated according to the start points and the end points of the characteristic line segments, specifically, the length d of each characteristic line segment is worked out according to the start point and the end point of the characteristic line segment;

as it is known that the each boundary of each position detection pattern of the Han Xin code includes seven data bits, the data bit width l of each position detection pattern of the Han Xin code is calculated according to the length d of the characteristic line segments specifically through the following equation:

$$l = \frac{\sqrt{2}}{2} \cdot d / 7.$$

9. A detection system for the characteristic patterns of Han Xin codes, characterized by comprising a processor and a memory having instructions stored therein, wherein the instructions, when executed, cause the processor to binarize a received two-dimensional code image;

search out the four vertexes of a Han Xin code region by scanning the two-dimensional code image line-by-line and column-by-column;

form the four boundaries and the two diagonal lines of the Han Xin code region by connecting every two vertexes of the four vertexes;

search out four characteristic line segments starting from the vertexes and having the continuous binarization values 1, 0, 1, 0,1 from the two diagonal lines and also searching out the end points of the characteristic line segments;

calculate the boundaries and the data bit width of the position detection patterns of the Han Xin code according to the start points and the end points of the characteristic line segments.

10. The detection system for the characteristic patterns of Han Xin codes according to claim 9, wherein the instructions, when executed, further cause the processor to record the number of data sets, each continuously including 1, 0, 1, 0,1, in each characteristic line segment from the start point of the characteristic line segment; analyze whether the similarities between the characteristic proportions and the standard characteristic proportion of the Han Xin code are within the range of the proportion threshold or not.

* * * * *